United States Patent
Saya et al.

[11] Patent Number: 5,336,958
[45] Date of Patent: Aug. 9, 1994

[54] ULTRASONIC MOTOR UNIT

[75] Inventors: Daisuke Saya; Ryoichi Suganuma, Yokohama, both of Japan

[73] Assignee: Nikon Corporation, Tokyo, Japan

[21] Appl. No.: 137,882

[22] Filed: Oct. 19, 1993

Related U.S. Application Data

[63] Continuation of Ser. No. 806,279, Dec. 13, 1991, abandoned.

[30] Foreign Application Priority Data

Dec. 19, 1990 [JP] Japan ................. 2-412141

[51] Int. Cl.⁵ ............................................. H01L 41/08
[52] U.S. Cl. ...................................... 310/316; 310/323
[58] Field of Search ................................ 310/316, 323

[56] References Cited

U.S. PATENT DOCUMENTS

| | | | |
|---|---|---|---|
| 4,678,956 | 7/1987 | Izukawa et al. | 310/323 |
| 4,692,649 | 9/1987 | Izukawa et al. | 310/316 |
| 4,713,571 | 12/1987 | Suzuki et al. | 310/316 |
| 4,794,294 | 12/1988 | Shimizu et al. | 310/316 |
| 4,952,834 | 8/1990 | Okada | 310/316 |
| 4,954,741 | 9/1990 | Furutsu et al. | 310/316 |
| 4,998,048 | 3/1991 | Furutsu | 310/316 |
| 5,001,404 | 3/1991 | Kataoka | 310/316 |
| 5,093,606 | 3/1992 | Adachi et al. | 310/316 |
| 5,136,215 | 8/1992 | Izukawa | 310/323 |
| 5,237,237 | 8/1993 | Ueda et al. | 310/323 |
| 5,247,221 | 9/1993 | Atsuta | 310/323 |

FOREIGN PATENT DOCUMENTS

| | | | |
|---|---|---|---|
| 60-91878 | 5/1985 | Japan | H02N 2/00 |
| 60-190178 | 9/1985 | Japan | H02N 2/00 |
| 0028279 | 2/1988 | Japan | 310/323 |

*Primary Examiner*—Thomas M. Dougherty
*Attorney, Agent, or Firm*—Shapiro and Shapiro

[57] ABSTRACT

An ultrasonic motor unit comprises a stator having a piezoelectric member and an elastic member which is excited by the piezoelectric member to generate a travelling vibration wave, and a rotor which is press-contacted to the stator and driven by the travelling vibration wave. At least two sets of input electrodes each having two input electrodes are circumferentially arranged on the piezoelectric member. A drive voltage is applied to only the selected ones of the input electrodes in accordance with a drive power requirement.

23 Claims, 8 Drawing Sheets

ULTRASONIC MOTOR UNIT

This is a continuation of application Ser. No. 806,279 filed Dec. 13, 1991, now abandoned.

BACKGROUND OF THE INVENTION

1. Field of the Invention

The present invention relates to an ultrasonic motor for driving a rotor by a travelling vibration wave generated in an elastic member by utilizing a vibration generated when a high frequency voltage is applied to a piezoelectric member of a stator.

2. Related Background Art

In prior art ultrasonic motors, two piezoelectric members are bonded to form a stator (Japanese Laid-Open Patent Application 60-91878), or two sets of electrodes are radially arranged (Japanese Laid-Open Patent Application 60-190178) in order to attain size reduction, easy forward/reverse rotation, high durability and high response.

However, where the two piezoelectric members are bonded together, a drive load is different between one member and the other member and a control therefor is difficult. Where the two sets of electrodes are radially arranged, if the dimensions of segments are different between an inner periphery and an outer periphery, wavelengths of the travelling vibration waves are different and a drive efficiency is lowered. Further, if the divisions of the segments of the electrodes on the inner periphery and the outer periphery are equal, the numbers of waves of vibrations generated on the inner periphery and the outer periphery are different and the control is difficult.

In any of the above cases, it is difficult to detect the precise status of operation by a single monitor electrode. Thus, full power drive is effected even if a low power drive is sufficient, and the suppression of power consumption is hard to attain.

SUMMARY OF THE INVENTION

It is an object of the present invention to provide an ultrasonic motor which solves the above problems and improves a relative drive efficiency by selectively driving a plurality of electrode provided on a piezoelectric member.

It is another object of the present invention to provide an ultrasonic motor unit which can detect the precise status of an ultrasonic motor by a plurality of monitors to attain fine control.

The ultrasonic motor unit of the present invention comprises a stator having a piezoelectric member and an elastic member which is excited by the piezoelectric member to generate a travelling vibration wave, and a driven member which is press-contacted to the stator and driven by the travelling vibration wave. At least two sets of input electrodes each having two input electrodes are arranged on the piezoelectric member.

In the present ultrasonic wave motor unit, a drive voltage is applied to only the selected ones of the input electrodes in accordance with a drive power requirement.

The the precise status of the drive of the ultrasonic motor can be detected by providing the plurality of monitor electrodes on the piezoelectric member.

DETAILED DESCRIPTION OF THE PREFERRED EMBODIMENTS

Figure 1:
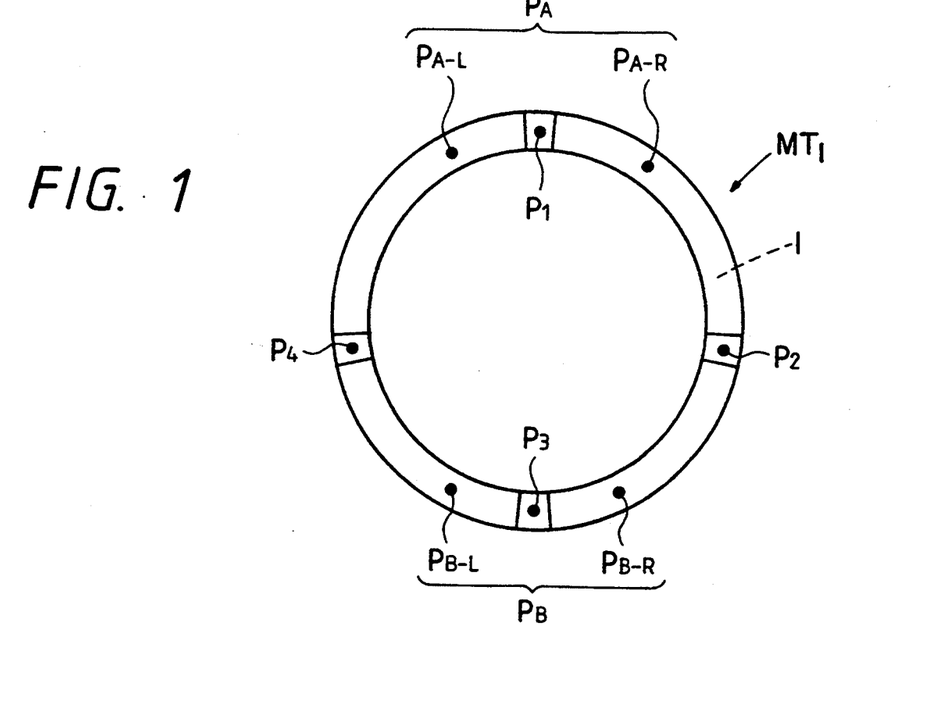
FIG. 1 shows a construction of electrodes on a piezoelectric member of an ultrasonic motor in a first embodiment.
Figure 2:
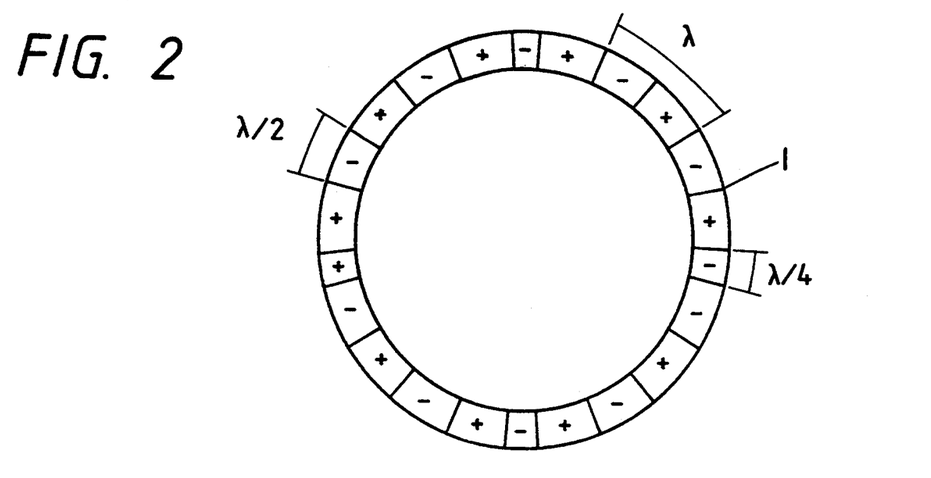
FIG. 2 shows a plan view illustrating polarization of the piezoelectric member of the ultrasonic motor of the first embodiment.
Figure 3:
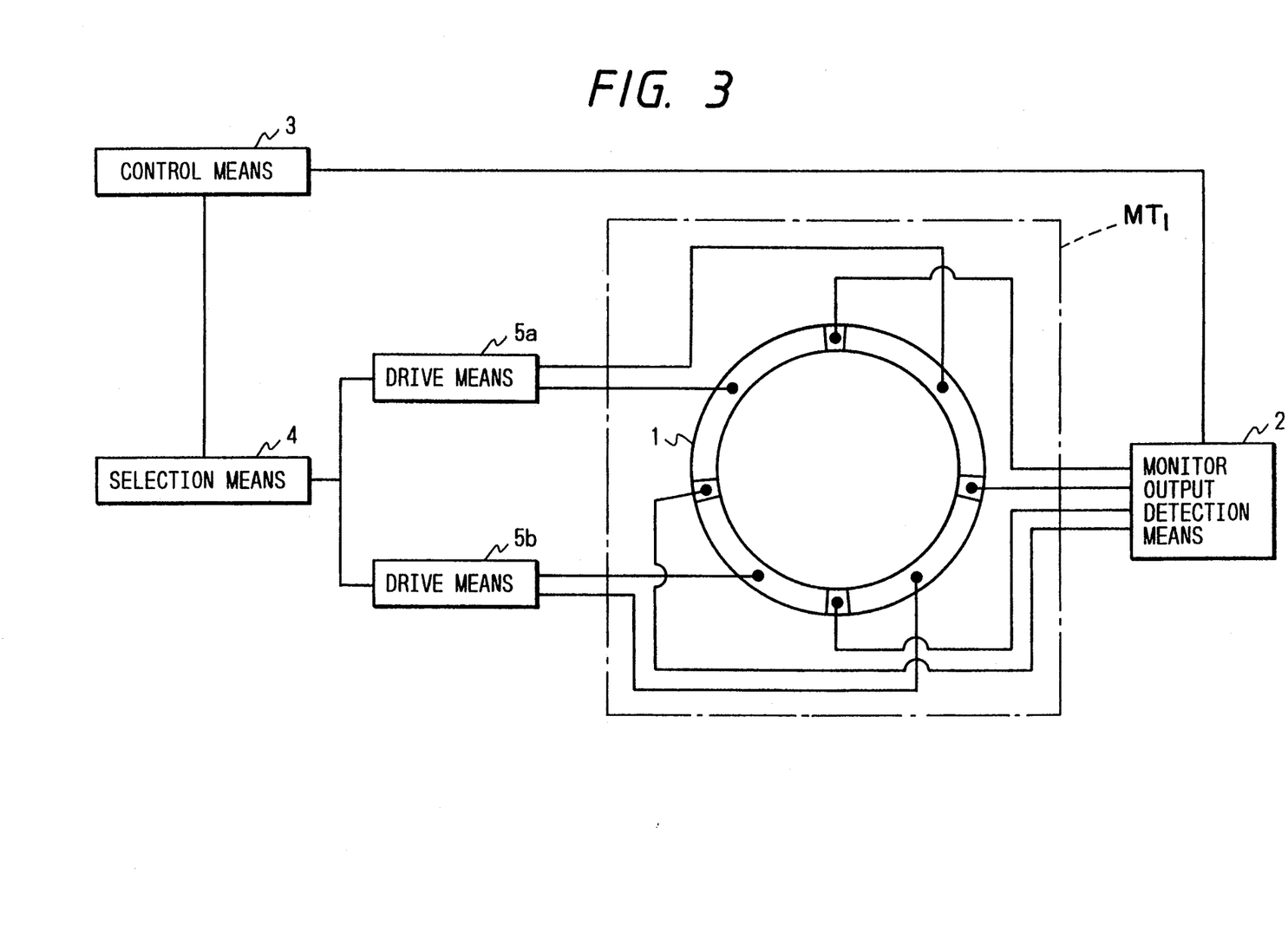
FIG. 3 shows a block diagram of the ultrasonic motor of the first embodiment.

A first embodiment of a motor $MT_1$ according to the invention will now be described in connection with FIGS. 1-3. A piezoelectric member 1 has arranged thereon two sets of input electrodes, including an electrode set $P_A$ and an electrode set $P_B$ each having two electrodes, and four monitor electrodes P1, P2, P3 and P4, all as shown in FIG. 1. FIG. 2 shows the polarization of the piezoelectric member 1. Portions of the member 1 corresponding to the electrodes $P_A$ and $P_B$ comprise segments of $\lambda/2$, which is one half of a wavelength of the travelling vibration wave. Portions of member 1 corresponding to the four monitor electrodes P1 - P4 are constituted by respective segments of $\lambda/5$.

The direction of polarization is such that in the portions corresponding to each electrode adjacent segments of $\lambda/2$ are polarized oppositely, and such that segments corresponding to adjacent end portions of electrodes of different sets are polarized oppositely, as shown in FIG. 2.

An embodiment including a first control unit is explained with reference to FIG. 3. The present embodiment comprises an ultrasonic motor $MT_1$, monitor output detection means 2, control means 3, selection means 4 and drive means 5a and 5b.

The monitor output detection means receives signals from the monitor electrodes P1, P2, P3 and P4 of the piezoelectric member 1 which is a part of the stator of the ultrasonic motor $MT_1$, and sends a status signal of the ultrasonic motor $MT_1$ to the control means 3.

Figure 9:
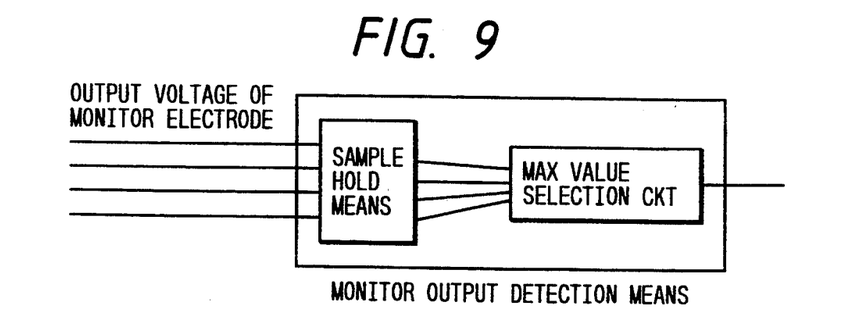
FIGS. 9 to 13 show block diagrams of configurations of monitor output detection means for the ultrasonic motor of the first embodiment.
Figure 10:
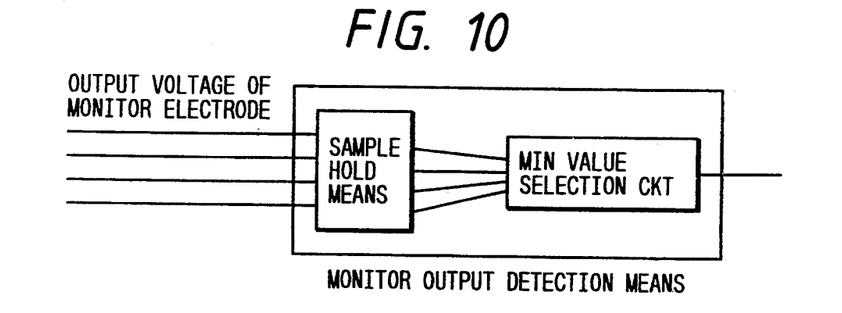
Figure 11:
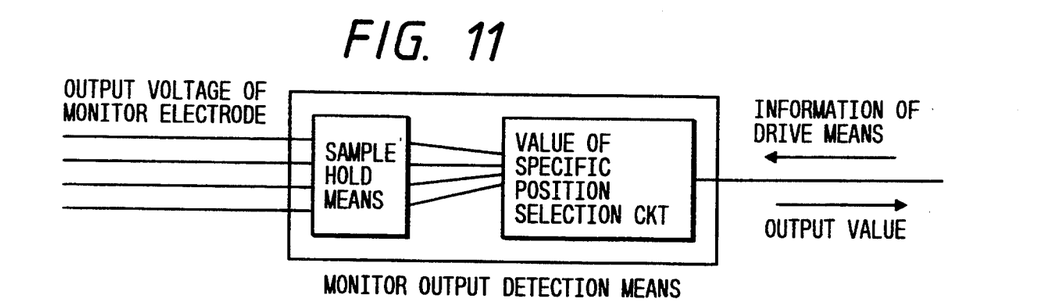
Figure 12:
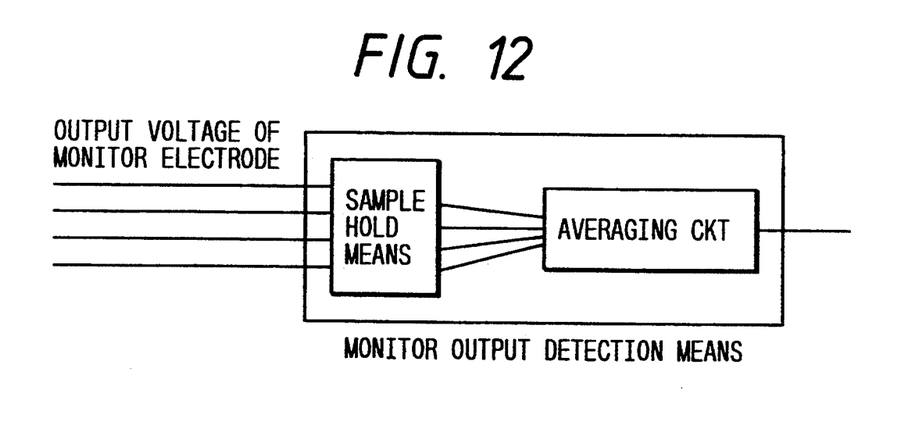
Figure 13:
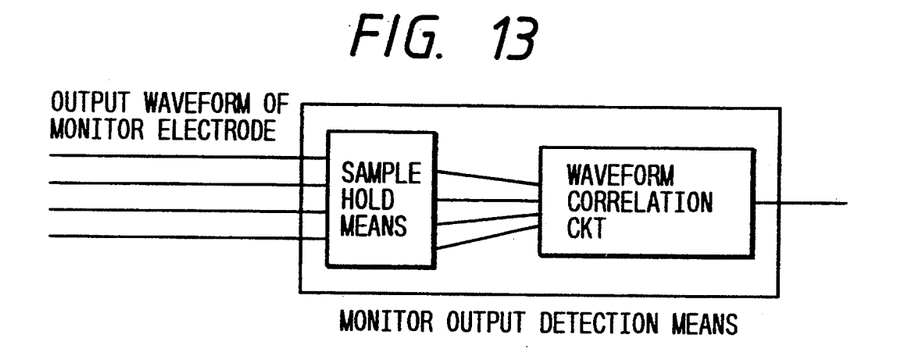

The monitor output detection means has sample and hold means for holding the input voltage, and also has output operation means for operating on input voltages held in the sample and hold means to calculate an output value. The output operation means may a maximum value of the input values as shown in FIG. 9. It may select a minimum value of the input values as shown in FIG. 10. It may further select one of the input values in accordance with the positions of the monitor electrodes and the positions of the drive electrodes, as shown in FIG. 11. It may average the input values as shown in FIG. 12. The monitor output detection means may include sample and hold means for holding the input voltage waveforms and output operation means which correlate the input voltage waveforms held by the sample and hold means to produce a correlation value, as will be appreciated from FIG. 13. The control means 3 sends a start signal to the ultrasonic motor $MT_1$ at a start stage, and during the drive it processes the signal from the monitor output detection means to generate a control signal to control the drive of the ultrasonic motor $MT_1$ through the selection means 4 and the drive means 5a and 5b.

Figure 14:
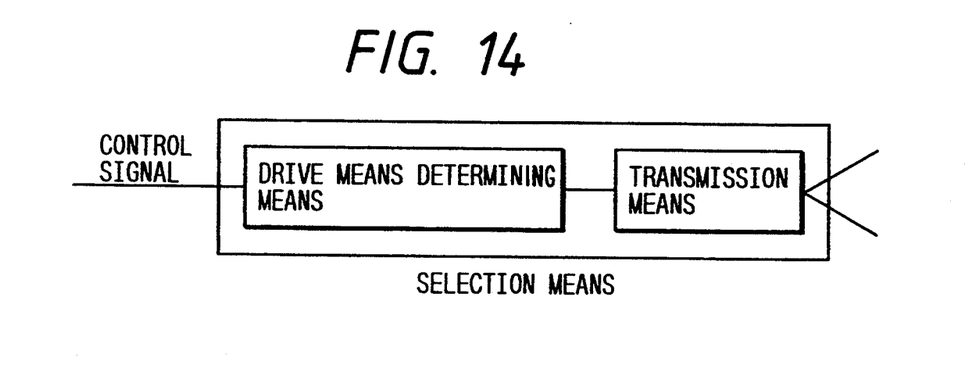
FIG. 14 shows a block diagram of a configuration of selection means of the ultrasonic motor of the first embodiment.
Figure 15:
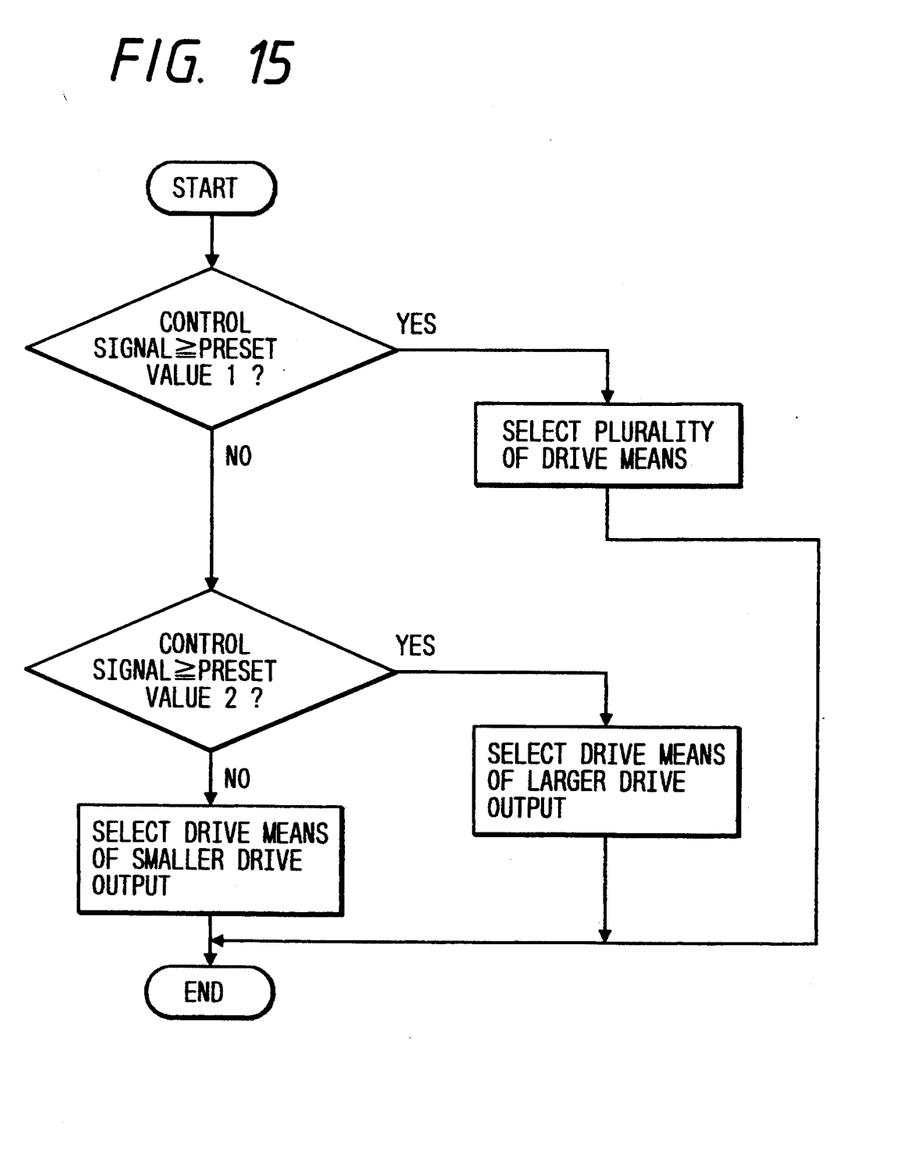
FIG. 15 shows a flow chart of an operation of the ultrasonic motor of the first embodiment.

As shown in FIG. 14, the selection means 4 comprises drive means determining (selection) means which processes the control signal from the control means 3 to select the drive means to drive the ultrasonic motor, and transmission means for sending the drive control signal to the drive means selected by the drive means selection means. The drive means selection means may be implemented by a CPU, and a process flow thereof is shown in FIG. 15. The operation is explained with reference to the flow. When the control signal from the control means 3 is larger than a preset value 1, a plurality of drive means are activated, and when the control signal is larger than a preset value 2 and smaller than the preset value 1, the drive means which provides a large drive output is activated. When the control signal is smaller than the preset value 2, the drive means which provides a small drive output is activated.

A drive control signal is sent from the transmission means to the drive means which is to be activated. The drive means selection means may be an arithmetic and logic unit instead of the CPU.

The drive means 5a and 5b are connected to the input electrode sets $P_A$ and $P_B$ to drive them in accordance with the signal from the selection means.

The operation which conforms to the motor output, which is a feature of the present invention is now explained. The motor output is represented by a product of a rotation speed of the motor and an output torque. When a large motor output is required, the electrodes on the piezoelectric member 1 are fully driven and the control means 3 generates a control signal to activate both drive means 5a and 5b through the selection means 4. To start the excitation of the piezoelectric member 1, the drive signals to the input electrodes $P_{A-R}$ and $P_{A-L}$ have a phase difference of $\pi/2$ or $-\pi/2$ so that the phases of the input electrodes $P_{A-R}$ and $P_{B-L}$ and the phases of the input electrodes $P_{A-L}$ and $P_{B-R}$ are equal. The excitation in the piezoelectric member 1 causes the generation of the travelling vibration wave in the elastic member so that the rotor is driven. The monitor output detection means 2 receives the outputs from the monitor electrodes P1, P2, P3 and P4 on the piezoelectric member 1 to effect the selection, averaging or correlation operation, and sequentially sends the status of the ultrasonic motor $MT_1$ to the control means 3 as the control signal. The control means 3 processes the control signal to control the ultrasonic motor $MT_1$. Stable drive and run are attained compared to the prior art motor in which one set of electrodes are arranged in one piezoelectric member because load to each electrode can be distributed.

When the motor output requirement is low, the control means produces a control signal to activate one of the drive means 5a and 5b, through the selection means 4. It is assumed that the drive means 5a is selected. The drive means 5a applies the drive signals having a phase difference of $\pi/2$ or $-\pi/2$ to the input electrodes $P_{A-R}$ and $P_{A-L}$ of the piezoelectric member 1 to excite the piezoelectric member 1 so that the elastic member (not shown) generates the travelling vibration wave to drive the rotor. As in the full power drive mode, the monitor output detection means 2 receives the monitor outputs from the monitor electrodes P1, P2, P3 and P4 of the piezoelectric member 1 to effect the selection, averaging or correlation operation, and sequentially sends the status of the ultrasonic motor $MT_1$ to the control means 3 as the control signal. The control means 3 processes the control signal to control the ultrasonic motor $MT_1$.

In this case, all electrodes of the piezoelectric member 1 need not be driven and no big change in the frequency is needed in controlling the drive of the motor as is needed in the prior art motor. Accordingly, the motor is efficiently driven in a stable drive range and power consumption is suppressed.

Figure 4:
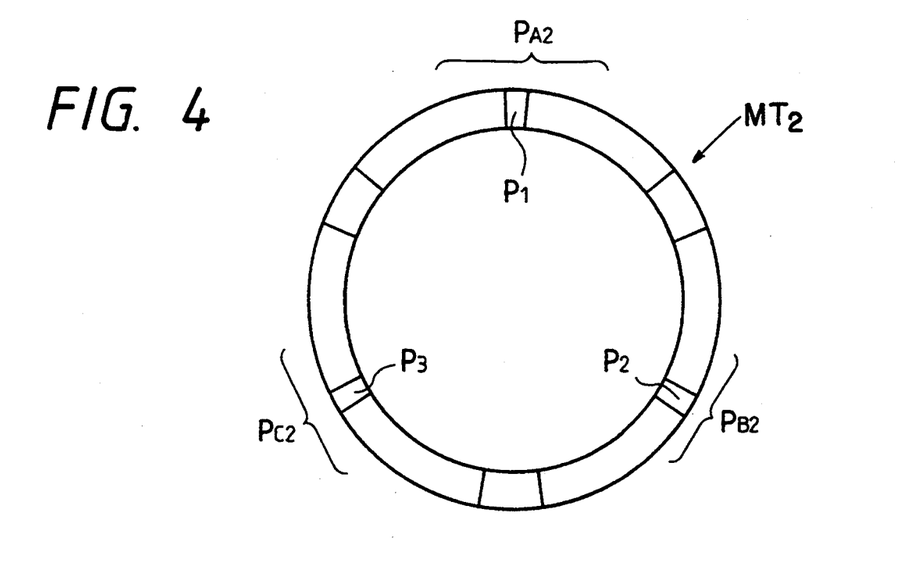
FIG. 4 shows a construction of electrodes on a piezoelectric member of an ultrasonic motor in a second embodiment.
Figure 5:
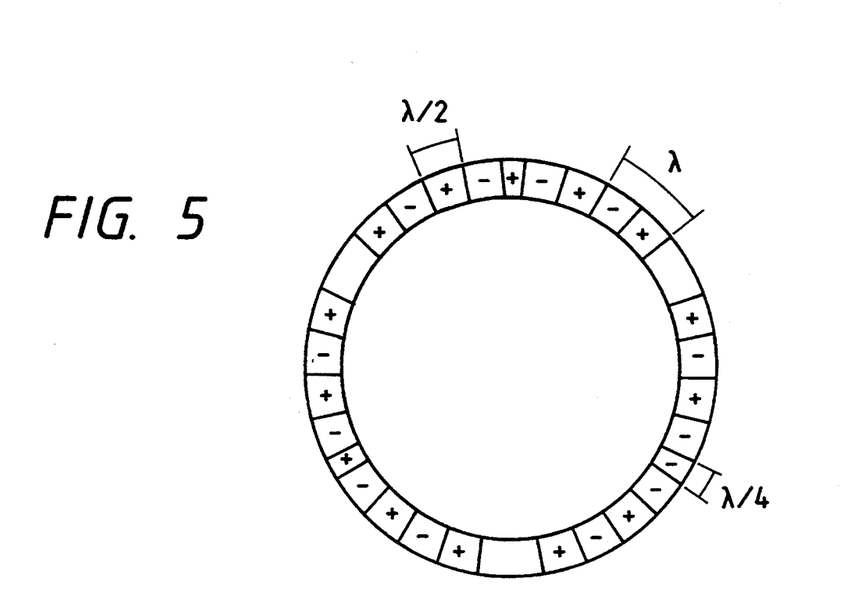
FIG. 5 shows polarization of the piezoelectric member of the ultrasonic motor of the second embodiment.

FIGS. 4 and 5 show the electrode arrangement and the polarization of the piezoelectric member of an ultrasonic motor $MT_2$ of a second embodiment. The ultrasonic motor $MT_2$ of the second embodiment has three sets of electrodes $P_{A2}$, $P_{B2}$ and $P_{C2}$ as shown in FIG. 4. They are driven at the same period, and one, two or three sets of electrodes $P_{A2}$, $P_{B2}$ and $P_{C2}$ are selectively activated in accordance with a torque required. As will be appreciated from FIG. 5, the monitor electrodes P1, P2 and P3 are of ¼ length of the wavelength as they are in the ultrasonic motor $MT_1$.

Figure 6:
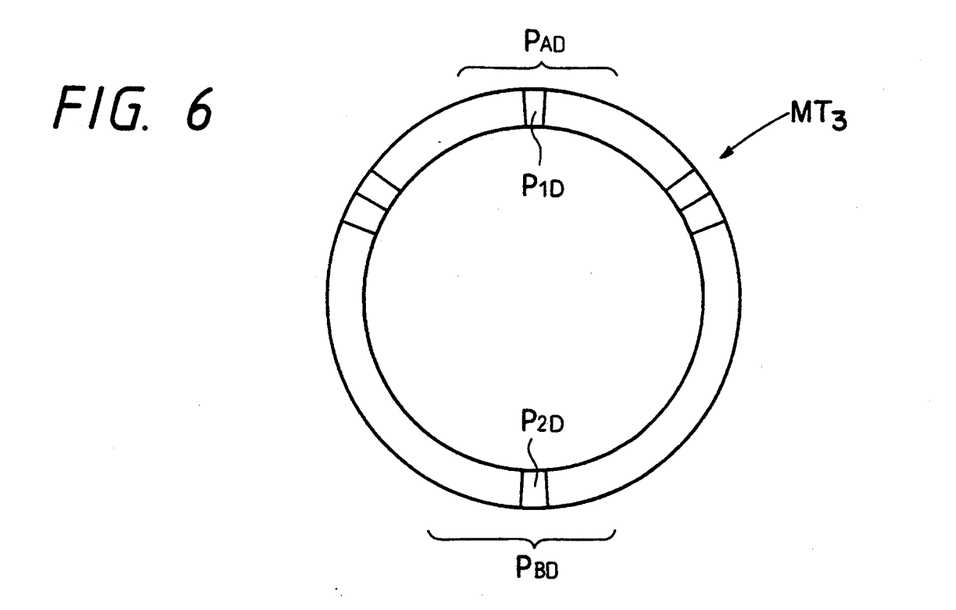
FIG. 6 shows a construction of electrodes on a piezoelectric member of an ultrasonic motor in a third embodiment.
Figure 7:
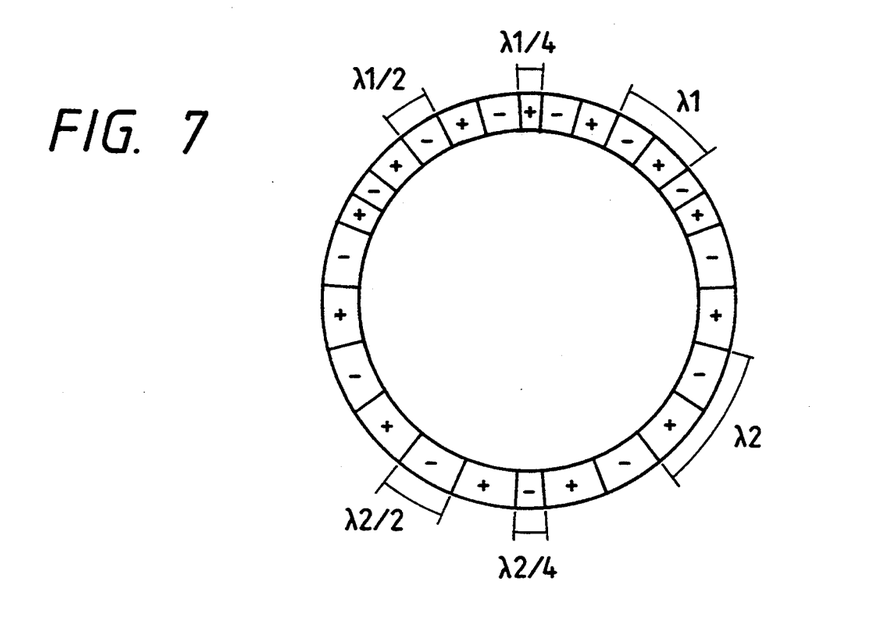
FIG. 7 shows polarization of the piezoelectric member of the ultrasonic motor of the third embodiment.

FIGS. 6 and 7 show the electrode arrangement and the polarization of the piezoelectric member of an ultrasonic motor $MT_3$ of a third embodiment. The ultrasonic motor $MT_3$ of the third embodiment has electrode sets $P_{AD}$ and $P_{BD}$ which are driven to generate travelling waves of different wavelengths $\lambda_1$ and $\lambda_2$, shown in FIG. 6. A monitor electrode $P_{1D}$ has a length of $\lambda_1/4$ and a monitor electrode $P_{2D}$ has a length of $\lambda_2/4$ as will be appreciated from the Figures. Drive signals having such periods that the travelling waves of the wavelengths $\lambda_1$ and $\lambda_2$ efficiently drive the motor are applied to the electrode sets $P_{AD}$ and $P_{BD}$, respectively.

Figure 8:
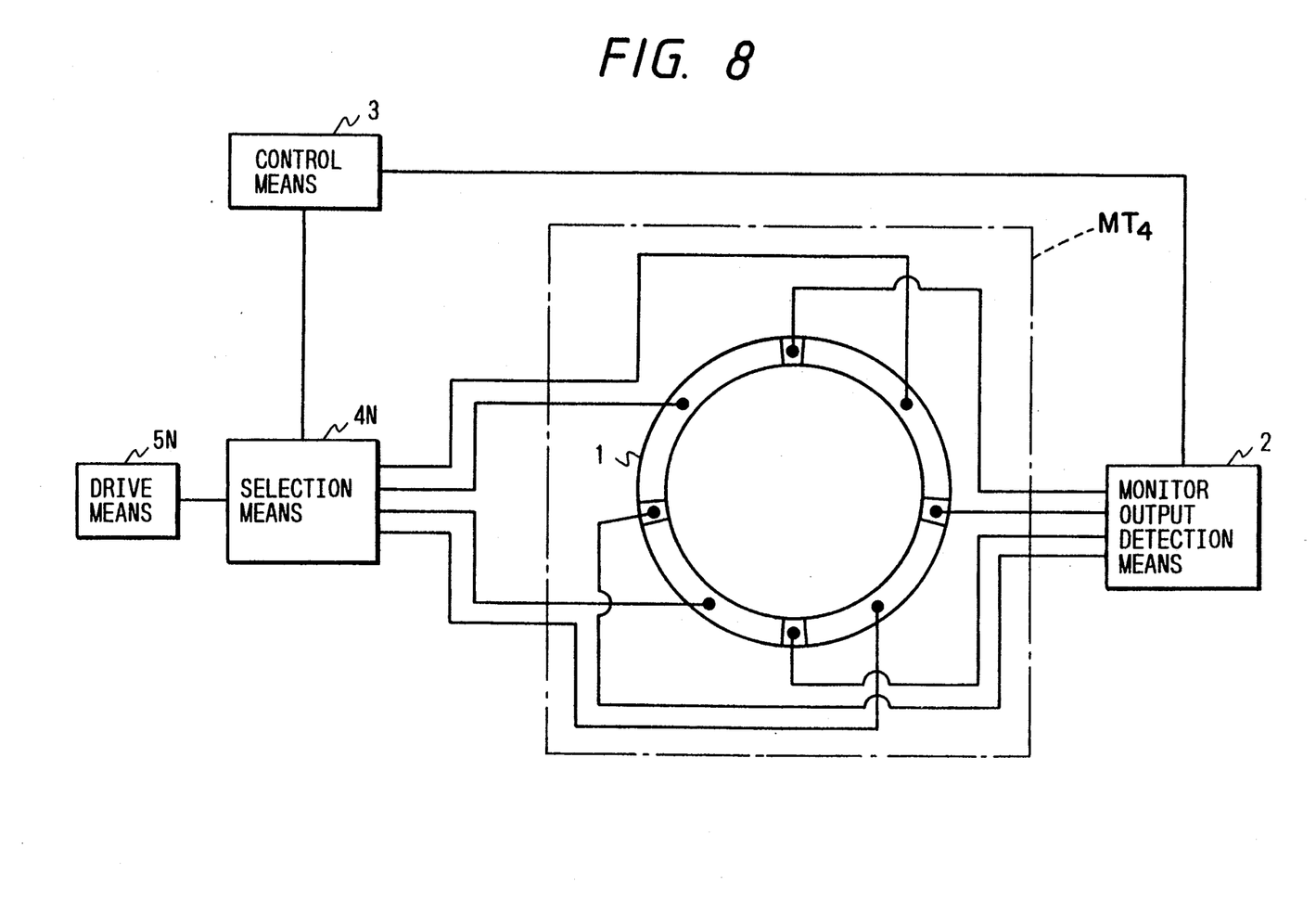
FIG. 8 shows a block diagram of an ultrasonic motor in a fourth embodiment.

FIG. 8 shows a block diagram of the ultrasonic motor in a fourth embodiment. The fourth embodiment comprises an ultrasonic motor, monitor output detection means 2, control means 3, selection means 4N and drive means 5N. The arrangement differs from the arrangement of FIG. 3 in that the selection means 4N is provided at the output side of the drive means 5N which is thus common to all of the electrodes. In order to drive the ultrasonic motor $MT_1$, a drive signal from the drive means 5N is applied to the electrode sets of the piezoelectric member 1 as selected by the selection means 4N.

When the motor output requirement is high, the control means 3 issues a control signal so that the selection means 4 selects all input electrode sets $P_A$ and $P_B$, as it does in the first embodiment. When the selection means 4 receives the control signal, it supplies the full drive signal for the drive means 5N to the input electrode sets $P_A$ and $P_B$. The drive signal is controlled by the control system including the control means 3, as it is in the first embodiment.

When the motor output requirement is low, the control means 3 issues a control signal to the selection means 4 to select any one of the input electrode sets (for example, $P_4$). When the selection means 4 receives the control signal, it selects the drive signal from the drive means 5N and supplies it to the input electrode set $P_4$. The control signal is controlled by the control system including the control means 3, as it is in the first embodiment.

Since the fourth embodiment need only one drive means, the circuit can be compacted.

The present invention is not limited to the above embodiments and various modifications thereof may be made without departing from its scope. For example, any combination of the piezoelectric members of the ultrasonic motors $MT_1$, $MT_2$, $MT_3$ and $MT_4$ and the control system may be used. The polarization of the piezoelectric member is not limited to those of the embodiments and the number of electrodes is not so limited. Elements of other drive control may be added to the control system.

What is claimed is:

1. An ultrasonic motor unit comprising:
    a stator including a piezoelectric member and an elastic member adapted to be excited by said piezoelectric member to generate a travelling vibration wave for driving a moving member;
    a first input electrode set having two input electrodes arranged on said piezoelectric member and each corresponding to a respective plurality of polarized portions of said piezoelectric member which collectively exhibit a plurality of polarization directions;
    a second input electrode set having two input electrodes arranged on said piezoelectric member and each corresponding to a respective plurality of polarized portions of said piezoelectric member which collectively exhibit a plurality of polarization directions; and
    means for selectively driving said first and second input electrode sets such that at least one of said first and second input electrode sets can be driven independently of the other.

2. An ultrasonic motor unit according to claim 1, wherein said driving means includes means for applying drive signals of different frequencies to said first and second input electrode sets.

3. An ultrasonic motor unit according to claim 1, wherein said driving means includes:
    first drive signal supply means for supplying a drive signal to said first input electrode set;
    second drive signal supply means for supplying a drive signal to said second input electrode set; and
    selection means for selectively enabling said first and second drive signal supply means.

4. An ultrasonic motor unit according to claim 3, further comprising a monitor electrode provided on said piezoelectric member between said first and second input electrode sets.

5. An ultrasonic motor unit according to claim 4, wherein said driving means includes control means for controlling said selection means in accordance with a monitor signal from said monitor electrode.

6. An ultrasonic motor unit according to claim 1, wherein said driving means includes:
    drive signal supply means for supplying a drive signal to drive said first and second input electrode sets; and
    selection means for selectively applying said drive signal to said first and second input electrodes sets.

7. An ultrasonic motor unit according to claim 6, further comprising a monitor electrode provided on said piezoelectric member between said first and second input electrode sets.

8. An ultrasonic motor unit according to claim 7, wherein said driving means includes control means for controlling said selection means in accordance with a monitor signal from said monitor electrode.

9. An ultrasonic motor unit according to claim 1, further comprising a monitor electrode provided on said piezoelectric member between said first and second input electrode sets.

10. An ultrasonic motor unit according to claim 1, wherein the respective plurality of polarized portions corresponding to each of said electrodes of said first input electrode set includes segments having a dimension determined in accordance with a first travelling vibration wave wavelength, and the respective plurality of polarized portions corresponding to each of said electrodes of said second input electrode set includes segments having a dimension determined in accordance with a second travelling vibration wave wavelength.

11. An ultrasonic motor unit according to claim 1, further comprising monitor detection means including a plurality of monitor electrodes provided on said piezoelectric member, sample and hold means for holding input voltage values from said monitor electrodes, and output operation means for processing the input voltage values held by said sample and hold means.

12. An ultrasonic motor unit according to claim 11, wherein said output operation means selects a maximum value of the input values.

13. An ultrasonic motor unit according to claim 11, wherein said output operation means selects a minimum value of the input values.

14. An ultrasonic motor unit according to claim 11, wherein said output operation means selects one of the input values in accordance with the positions of the monitor electrodes and the positions of the input electrodes.

15. An ultrasonic motor unit according to claim 11, wherein said output operation means averages the input values.

16. An ultrasonic motor unit according to claim 1, further comprising monitor detection means including a plurality of monitor electrodes provided on said piezoelectric member, sample and hold means for holding input waveforms from said monitor electrodes, and output operation means for correlating the input waveforms held by said sample and hold means.

17. An ultrasonic motor unit comprising:
    a stator including a piezoelectric member and an elastic member adapted to be excited by said piezoelectric member to generate a travelling vibration wave for driving a moving member;
    a first input electrode set having two input electrodes arranged on said piezoelectric member and each corresponding to a respective plurality of polarized portions of said piezoelectric member which collectively exhibit a plurality of polarization directions; and
    a second input electrode set having two input electrodes arranged on said piezoelectric member and each corresponding to a respective plurality of polarized portions of said piezoelectric member which collectively exhibit a plurality of polarization directions;

at least one first monitor electrode provided between said first and second input electrode sets;

a pair of second monitor electrodes, a respective second monitor electrode being provided between said two electrodes of each of said first and second input electrode sets; and determination means for determining a motor driving condition in accordance with monitor signals from said first and second monitor electrodes.

18. An ultrasonic motor unit according to claim 17, wherein said determination means includes:

sample and hold means for holding input voltage values from said first and second monitor electrodes; and output operation means for processing the input voltage values held by said sample and hold means.

19. An ultrasonic motor unit according to claim 18, wherein said output operation means selects a maximum value of the input values.

20. An ultrasonic motor unit according to claim 18, wherein said output operation means selects a minimum value of the input values.

21. An ultrasonic motor unit according to claim 18, wherein said output operation means selects one of the input values in accordance with the positions of the monitor electrodes and the positions of the input electrodes.

22. An ultrasonic motor unit according to claim 18, wherein said output operation means averages the input values.

23. An ultrasonic motor unit according to claim 17, wherein said determination means includes:

sample and hold means for holding input waveforms from said first and second monitor electrodes, and output operation means for correlating the input waveforms held by said sample and hold means.

* * * * *